US008896990B2

(12) United States Patent
Cho et al.

(10) Patent No.: US 8,896,990 B2
(45) Date of Patent: Nov. 25, 2014

(54) ELECTRONIC DEVICE COVER

(75) Inventors: Chih-Kang Cho, New Taipei (TW);
Ke-Fei Zou, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 201 days.

(21) Appl. No.: 13/557,290

(22) Filed: Jul. 25, 2012

(65) Prior Publication Data
US 2014/0002967 A1 Jan. 2, 2014

(30) Foreign Application Priority Data
Jun. 27, 2012 (CN) .......................... 2012 1 0214909

(51) Int. Cl.
*H05K 5/00* (2006.01)
*H05K 7/00* (2006.01)
*G06G 1/16* (2006.01)
*B65D 5/52* (2006.01)
*B65D 25/24* (2006.01)

(52) U.S. Cl.
USPC .............. 361/679.01; 361/679.3; 361/679.41; 361/679.56; 206/45.2

(58) Field of Classification Search
USPC ............. 361/679.41, 679.44, 679.55, 679.01, 361/679.3, 679.56; 206/45.2
See application file for complete search history.

(56) References Cited

U.S. PATENT DOCUMENTS 5,440,502 A * 8/1995 Register .................... 361/679.17
6,256,193 B1 * 7/2001 Janik et al. ............... 361/679.59
8,644,893 B2 * 2/2014 Liang ......................... 455/575.1

\* cited by examiner

*Primary Examiner* — Anthony Haughton
(74) *Attorney, Agent, or Firm* — Novak Druce Connolly Bove + Quigg LLP

(57) ABSTRACT

An electronic device cover includes a protection member and a support. The protection member includes a protection plate. The support member is rotatably mounted to the protection member and includes a support plate. The support member is rotatable between a protection position and a support position relative to the protection member; when the support member is in the support position, the support member supports the protection plate in a stand position, and the protection plate and the support plate define a corner therebetween; when the support member is in the protection position, the protection plate and the support plate are unfolded and define a receiving space.

20 Claims, 4 Drawing Sheets

ELECTRONIC DEVICE COVER

BACKGROUND

1. Technical Field

The present disclosure relates to electronic device covers, and particularly a tablet computer cover.

2. Description of Related Art

Electronic devices, such as tablet computers, include screens. Each tablet computer is received in a cover to protect the screen from being scratched. The cover may be made from leather and include a first panel and a second panel. The first panel is secured to a rear panel of the tablet computer by a latching structure. The second panel covers the screen. When the tablet computer needs to be positioned on a table, an additional bracket is needed to support the tablet with the cover. Thus, each tablet computer needs a cover plus an additional bracket, which makes the tablet computer expensive and inconvenient in carry. Furthermore, it is difficult to remove the tablet computer from the cover, and a tablet computer enclosure may also be scratched by the latching structure when the tablet computer is removed from the cover. Therefore, an improved electronic device cover may be desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
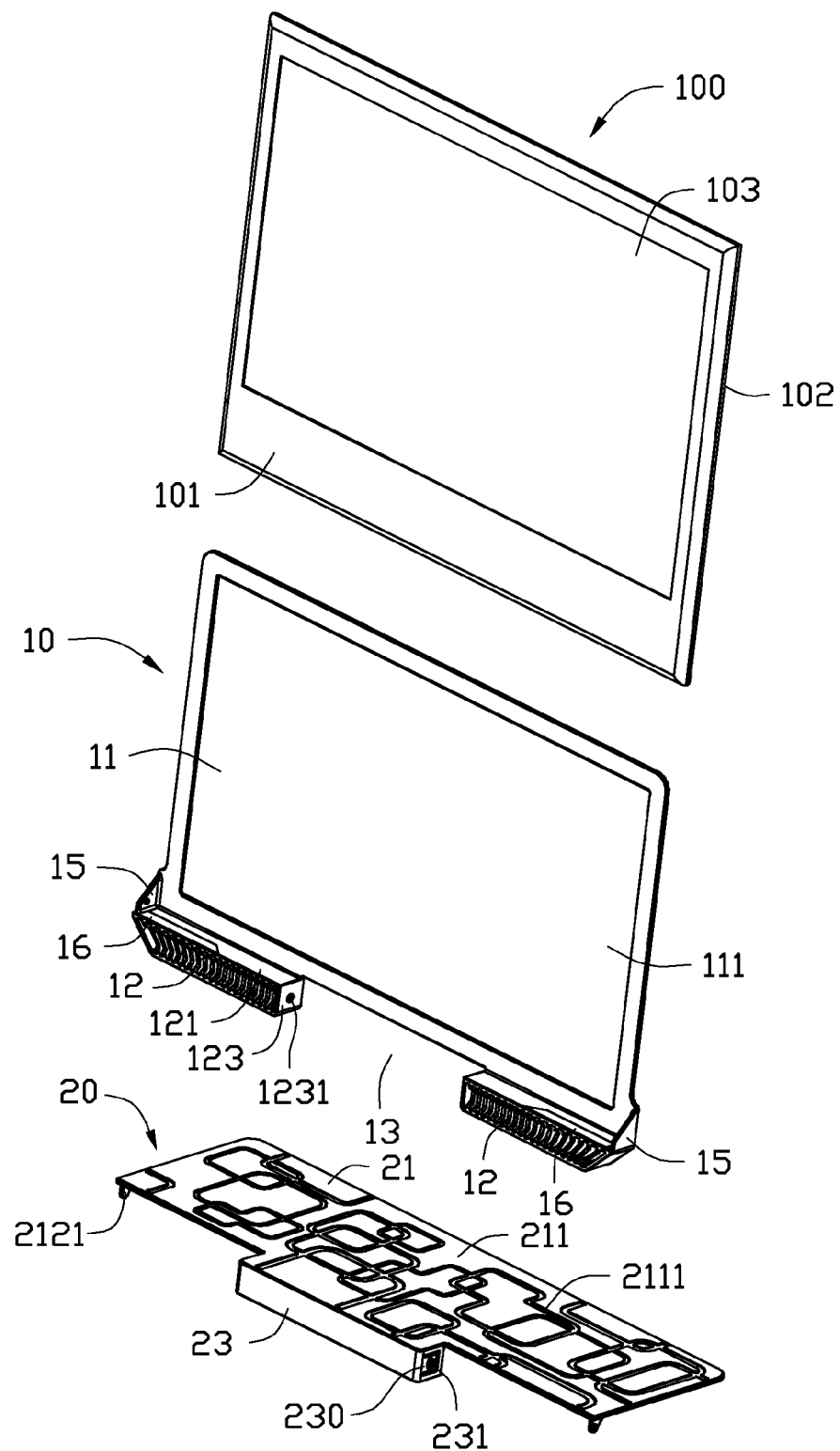
FIG. 1 is an exploded, isometric view of one embodiment of an electronic device cover and an electronic device.

FIG. 1 shows an electronic device cover in accordance with an embodiment for protection an electronic device 100. The electronic device cover includes a protection member 10 and a support member 20.

The electronic device 100 includes a front panel 101, a rear panel 102 opposite to the front panel 101, and a screen 103 secured to the front panel 101. In one embodiment, the electronic device 100 is a tablet computer, and the front panel 101 is substantially parallel to the rear panel 102. In one embodiment, the electronic device 100 is a tablet computer.

Figure 4:
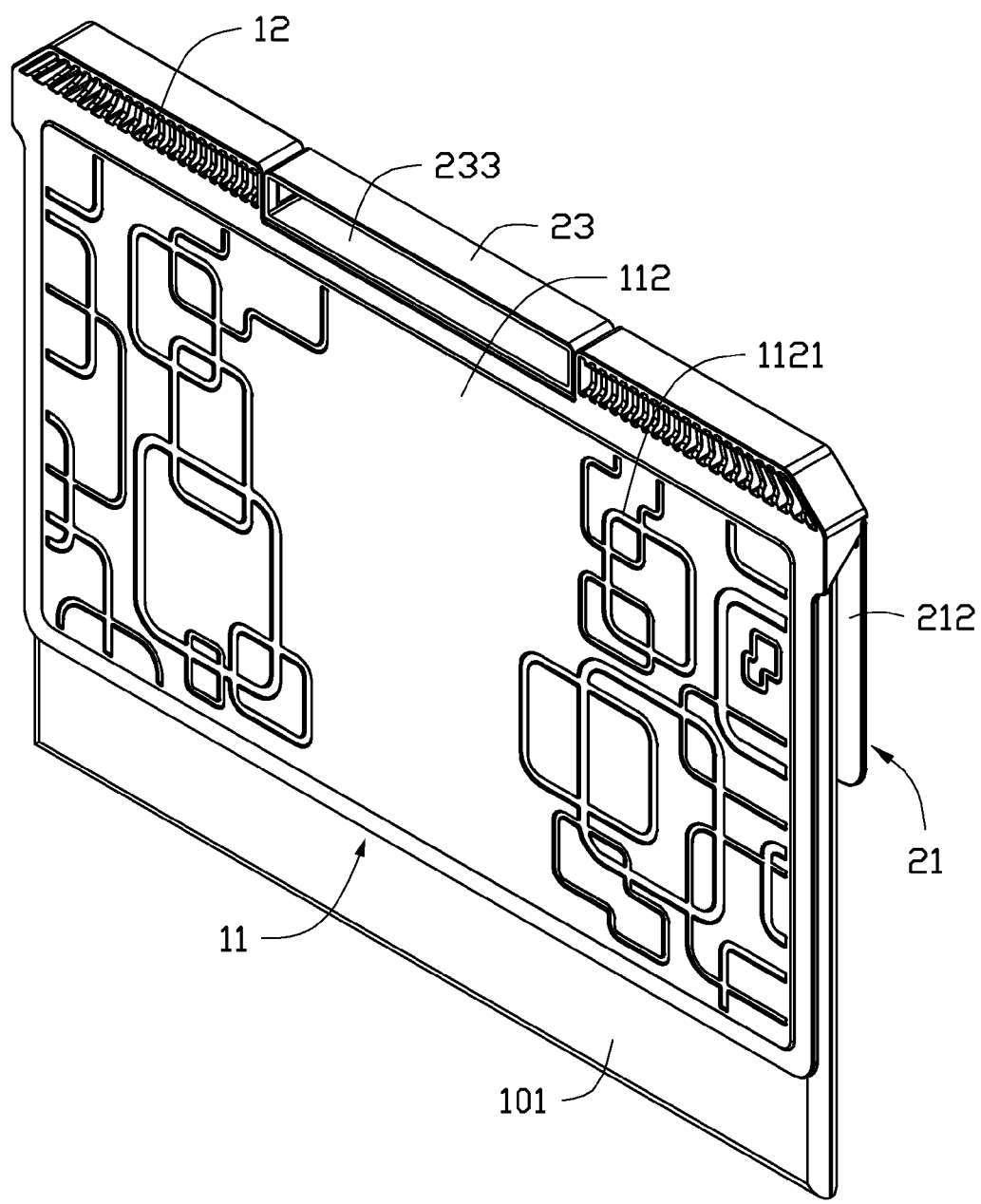
FIG. 4 is another assembled, isometric view of the electronic device cover and the electronic device of FIG. 1, and the support member is located in a protection position.

The protection member 10 includes a protection plate 11 and two installation portions 12 extending from a bottom edge of the protection plate 11. A size of the protection plate 11 is substantially equal to the size of the screen 103. The protection plate 11 includes a first plane 111 and a second plane 112 (as shown in FIG. 4), opposite to the first plane 111. The second plane 112 includes a plurality of first patterns 1121, to make the second plane 112 more appealing to the eye. Each of the two installation portions 12 is located on the first plane 111 and includes a support piece 121 and an installation piece 123. The support piece 121 is connected to the bottom edge of the protection plate 11 and is substantially perpendicular to the first plane 111. The installation piece 123 extends from a side edge of the support piece 121 and is substantially perpendicular to the front panel 101 and the support piece 121. The installation piece 123 defines an installation hole 1231. An installation space 13 is defined between the installation pieces 123 of the two installation portions 12. The protection member 10 further includes two first limiting pieces 15 and two second limiting pieces 16. Each of the two first limiting pieces 15 connects each of two opposite side edges of the first plane 111 and each of the two support pieces 121. The two opposite side edges of the first plane 111 are substantially perpendicular to the bottom edge of the protection plate 11. Each of the two second limiting pieces 16 extends from the support piece 121. In one embodiment, each of the two second limiting pieces 16 is substantially perpendicular to the support piece 121 and each of the two first limiting pieces 15, and each of the two first limiting pieces 15 is substantially perpendicular to the first plane 111 and each of the two support pieces 121.

The support member 20 includes a support plate 21 and a securing portion 23 connected to the support plate 21. The support plate 21 includes a first support plane 211 and a second support plane 212 (show as in FIG. 3) opposite to the first support plane 211. The first support plane 211 includes a plurality of second patterns 2111, to make the first support plane 211 appealing to the eye. The securing portion 23 is located on the second support plane 212. Two resilient pieces 230 located on two opposite sides of the securing portion 23. A pivoting shaft 231 protrudes from each of the two resilient pieces 230. In one embodiment, the securing portion 23 is a cuboid. The securing portion 23 defines a receiving slot 233 (show as in FIGS. 2-4). The receiving slot 233 is for receiving a USB cable. Two support legs 2121 are located on the second support plane 212.

Figure 2:
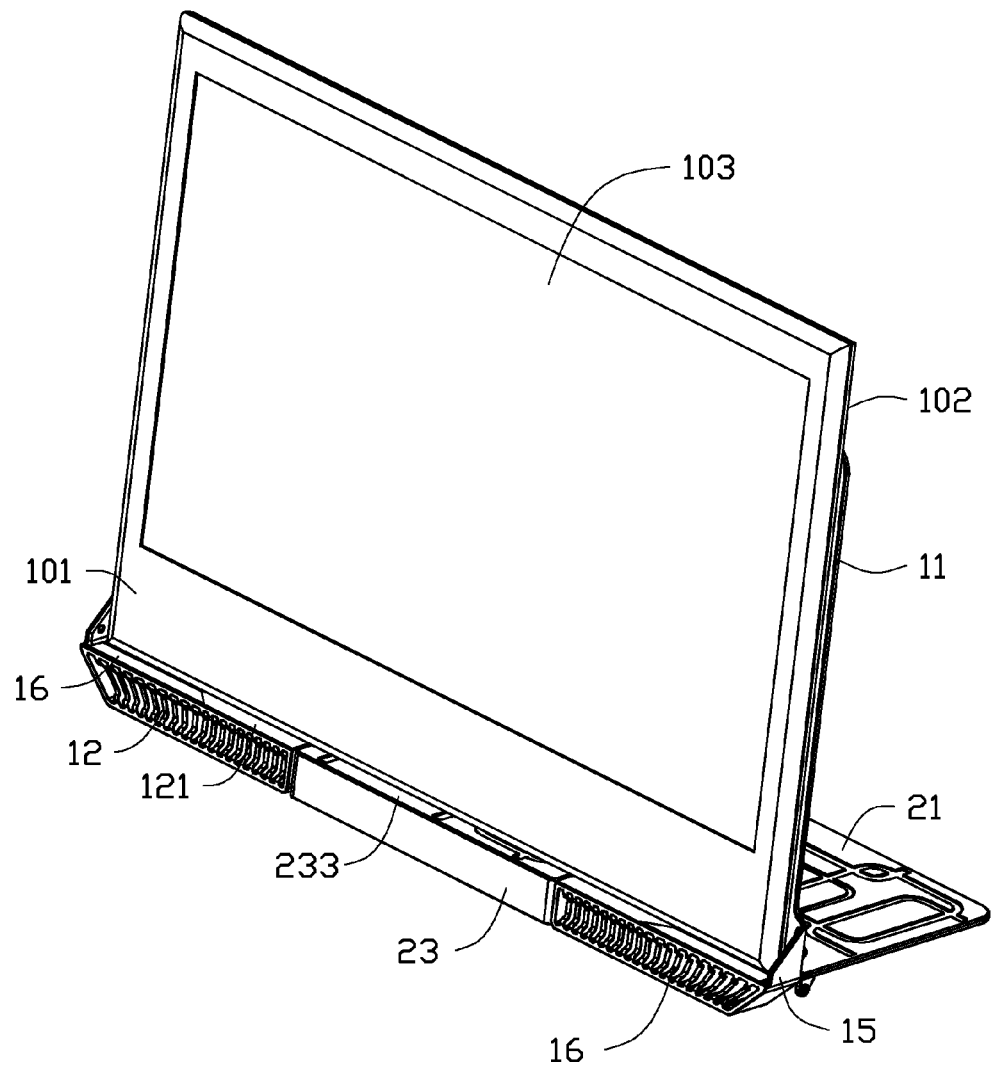
FIG. 2 is an assembled, isometric view of the electronic device cover and the electronic device of FIG. 1, and a support member is located in a support position.

FIG. 1 and FIG. 2 show that, in assembly, the first support plane 211 of the support plate 21 is facing the second plane 112. The securing portion 23 is placed in the installation space 13. The two resilient pieces 230 are elastically deformed relative to each other. When the pivoting shaft 231 is aligned with the installation hole 1231, each of the two resilient pieces 230 rebounds to engage in the installation hole 1231. Thus, the securing portion 23 is rotatably received in the installation space 13, and the support member 20 is rotatable relative to the protection member 10.

Figure 3:
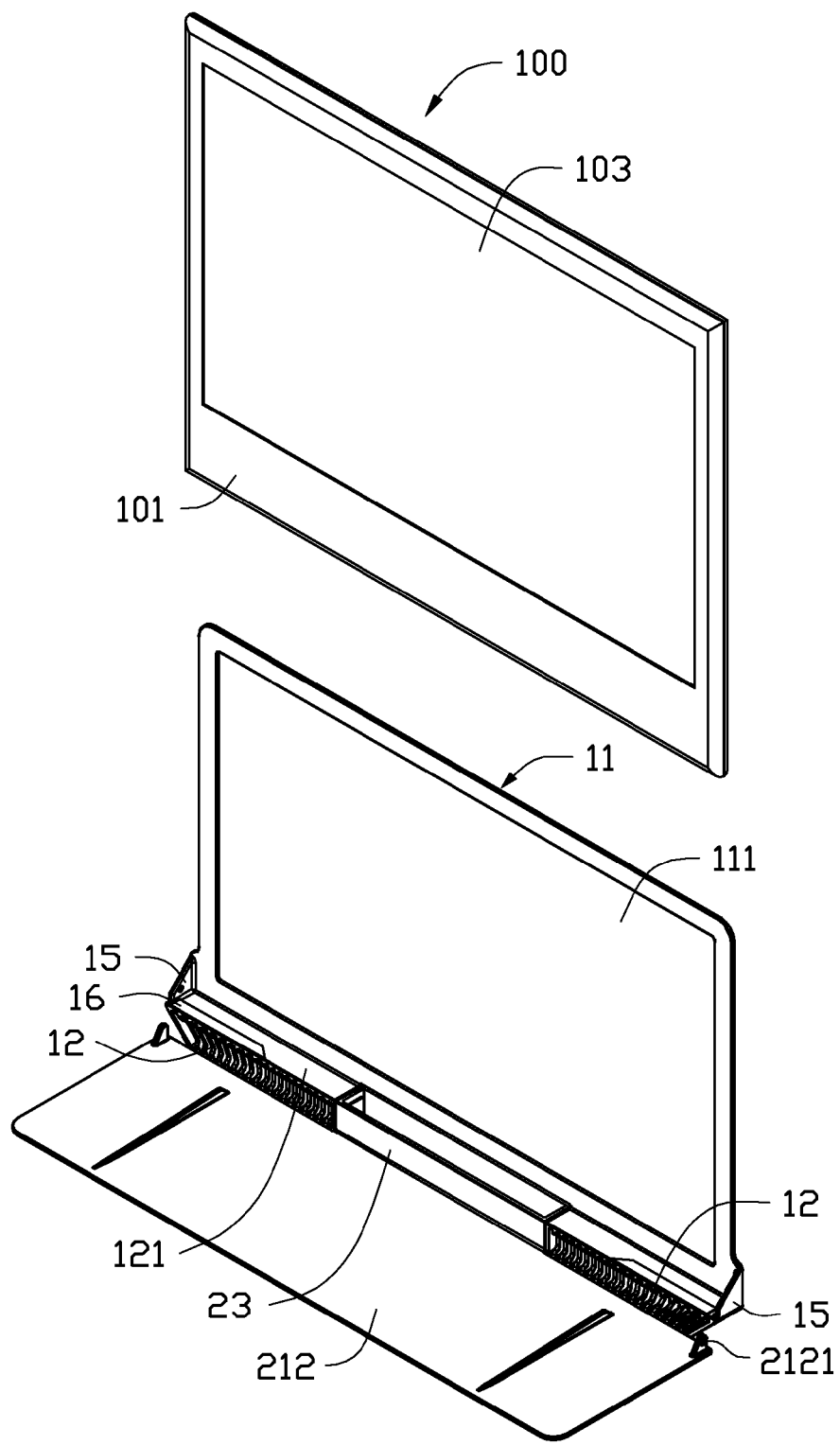
FIG. 3 is a partially assembled, isometric view of the electronic device cover and the electronic device of FIG. 1, and the support member is located in a different state.

FIGS. 2-4 show that, the support member 20 is rotatable between a support position and a protection position. If the support member 20 is located in the support position, the first support plane 211 faces the second plane 112, and an angle is defined between the protection plate 11 and the support plate 21, and the angle is smaller than or equal to 90 degrees. If the support member 20 is located in the protection position, the second support plane 212 faces the first plane 111, and the protection plate 11 is substantially parallel to the support plate 21.

In use, if the electronic device 100 needs to be positioned in a table (not shown), the support member 20 is rotated to the support position along a first direction. The second support plane 212 faces the table and is substantially parallel to the table, and the support legs 2121 abut the table. The electronic device 100 is placed on the support piece 121 and located between the two first limiting pieces 15. The rear panel 102 abuts the first plane 111. The two second limiting pieces 16 prevents the electronic device from sliding out of the support piece 121. In this position, the support member 20 supports the electronic device 100 and the protection member 10 to stand on the table.

When the electronic device 100 needs to be carried or stored, referring to FIG. 3, the support member 20 is rotated along a second direction opposite to the first direction. The second support plane 212 faces the first plane 111. The first plane 111 faces the screen 103. The electronic device 100 is received between the protection plate 11 and the support plate 21, and the protection plate 11 covers the screen 103. The support member 20 is further rotated until the support member 20 is located in the protection position. In this position, the protection plate 11 prevents the screen 103 from being scratched when the electronic device 100 is not used.

In another embodiment, the two support legs 2121 are not positioned on the second support plane 212. When the support member 20 is positioned in the support position, the second support plane 212 abuts the table directly and is parallel to the table.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure, to the full extent indicated by the broad general meaning of the terms in which the appended claims are expressed.

What is claimed is:

1. An electronic device cover comprising:
a protection member comprising a protection plate and two installation portions connected to the protection plate;
a support member rotatably mounted to the protection member and comprising a support plate and a securing portion connected to the support plate;
wherein the securing portion comprises two resilient pieces and two pivoting shafts protruding from the two resilient pieces; and the securing portion is received between two installation pieces of the two installation portions, and each of the two pivoting shafts is rotatably engaged with an installation portion, the two pivoting shafts are rotated when the support member is rotated; the support member is rotatable between a protection position and a support position relative to the protection member; when the support member is in the protection position, the protection plate and the support plate are folded and define a receiving space; when the support member is in the support position, the protection plate and the support plate are unfolded, the support member supports the protection plate in a stand position, and the protection plate and the support plate define an angle therebetween.

2. The electronic device cover of claim 1, wherein when the support member is located in the support position, and the angle is smaller than or equal to 90 degrees; when the support member is located in the protection position, the support plate is substantially parallel to the protection plate.

3. The electronic device cover of claim 1, wherein the support member is rotated from the protection position to the support position along a first direction, the support member is rotated from the support position to the protection position along a second direction, and the first direction is opposite to the second direction.

4. The electronic device cover of claim 1, wherein an installation space is defined between the two installation portions; and the securing portion is rotatably received in the installation space.

5. The electronic device cover of claim 1, wherein each of the two installation portions comprises a support piece, and the support piece is substantially perpendicular to the protection plate and adapted to support a bottom portion of the electronic device.

6. The electronic device cover of claim 5, wherein each of the two installation portions further comprises an installation piece extending from the support piece, and the installation piece defines an installation hole; and the securing portion is received between two installation pieces of the two installation portions, and each of the two pivoting shafts is rotatably engaged in the installation hole.

7. The electronic device cover of claim 5, wherein each of the two installation portions further comprises a first limiting piece and a second limiting piece; the first limiting pieces are adapted to receive the electronic device therebetween to prevent the electronic device from moving along a third direction, the second limiting pieces are adapted to receive the electronic device therebetween to prevent the electronic device from moving along a fourth direction, and the third direction is substantially perpendicular to the fourth direction.

8. The electronic device cover of claim 7, wherein the first limiting piece is substantially perpendicular to the second limiting piece, and the first limiting piece and the second limiting piece are substantially perpendicular to the support piece.

9. The electronic device cover of claim 1, wherein the securing portion defines a receiving slot for receiving a data cable.

10. The electronic device cover of claim 1, wherein the support member further comprises a plurality of support legs located on the support plate.

11. An electronic device cover comprising:
a protection member comprising a protection plate and two installation portions connected to the protection plate;
a support member rotatably mounted to the protection member and comprising a support plate and a securing portion connected to the support plate;
wherein the securing portion comprises two resilient pieces and two pivoting shafts protruding from the two resilient pieces; and the securing portion is received between two installation pieces of the two installation portions, and each of the two pivoting shafts is rotatably engaged with an installation portion, the two pivoting shafts are rotated when the support member is rotated; the support member is rotatable between a protection position and a support position relative to the protection member; when the support member is in the support position, an acute angle is defined between the support plate and the protection plate, and the support member supports the protection plate in a stand position, and the protection plate and the support plate define an angle therebetween; when the support member is in the protection position, the support plate is substantially parallel to the protection plate.

12. The electronic device cover of claim 11, wherein when the support member is located in the support position, the support plate is substantially perpendicular to the protection plate.

13. The electronic device cover of claim 11, wherein the support member is rotated from the protection position to the support position along a first direction, the support member is rotated from the support position to the protection position along a second direction, and the first direction is opposite to the second direction.

14. The electronic device cover of claim 11, wherein an installation space is defined between the two installation portions; and the support member further comprises a securing portion connected to the support plate, and the securing portion is rotatably received in the installation space.

15. The electronic device cover of claim 11, wherein each of the two installation portions comprises a support piece, and the support piece is substantially perpendicular to the protection plate and adapted to support a bottom portion of the electronic device.

16. The electronic device cover of claim 15, wherein the installation piece defines an installation hole; and the securing portion is received between two installation pieces of the two installation portions, and each of the two pivoting shafts is rotatably engaged in the installation hole.

17. The electronic device cover of claim 15, wherein each of the two installation portions further comprises a first limiting piece and a second limiting piece; the first limiting pieces are adapted to receive the electronic device therebetween to prevent the electronic device from moving along a third direction, the second limiting pieces are adapted to receive the electronic device therebetween to prevent the electronic device from moving along a fourth direction, and the third direction is substantially perpendicular to the fourth direction.

18. The electronic device cover of claim 17, wherein the first limiting piece is substantially perpendicular to the second limiting piece, and the first limiting piece and the second limiting piece are substantially perpendicular to the support piece.

19. The electronic device cover of claim 11, wherein the securing portion defines a receiving slot for receiving a data cable.

20. The electronic device cover of claim 11, wherein the support member further comprises a plurality of support legs located on the support plate.

* * * * *